(12) United States Patent
Chen

(10) Patent No.: US 8,457,030 B2
(45) Date of Patent: Jun. 4, 2013

(54) MOBILE PHONE AND METHOD FOR RECEIVING CALLS

(75) Inventor: Chih-Hao Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 303 days.

(21) Appl. No.: 13/048,900

(22) Filed: Mar. 16, 2011

(65) Prior Publication Data

US 2012/0224567 A1 Sep. 6, 2012

(30) Foreign Application Priority Data

Mar. 3, 2011 (CN) .......................... 2011 1 0051081

(51) Int. Cl.
*H04W 40/00* (2009.01)

(52) U.S. Cl.
USPC ........................... 370/311; 370/465; 455/574

(58) Field of Classification Search
USPC .................................. 370/311, 465; 455/574
See application file for complete search history.

(56) References Cited

U.S. PATENT DOCUMENTS

| | | | | |
|---|---|---|---|---|
| 7,089,005 | B2 * | 8/2006 | Reddy | 455/436 |
| 7,395,085 | B1 * | 7/2008 | Mauer et al. | 455/552.1 |
| 7,414,992 | B2 * | 8/2008 | Hirsbrunner et al. | 370/331 |
| 7,502,615 | B2 * | 3/2009 | Wilhoite et al. | 455/442 |
| 7,720,021 | B1 * | 5/2010 | Zhou et al. | 370/315 |
| 7,742,768 | B2 * | 6/2010 | Liu et al. | 455/445 |
| 7,809,381 | B2 * | 10/2010 | Aborn et al. | 455/456.5 |
| 7,970,434 | B2 * | 6/2011 | Juang | 455/552.1 |
| 7,991,399 | B2 * | 8/2011 | Ganesan | 455/436 |
| 8,005,070 | B2 * | 8/2011 | Marsh et al. | 370/352 |
| 8,134,955 | B2 * | 3/2012 | Rahman et al. | 370/328 |
| 8,149,820 | B2 * | 4/2012 | Shaheen | 370/352 |
| 8,325,672 | B2 * | 12/2012 | Du et al. | 370/331 |
| 2004/0264424 | A1 * | 12/2004 | Hirsbrunner et al. | 370/338 |
| 2005/0117566 | A1 * | 6/2005 | Davidson | 370/352 |
| 2005/0147049 | A1 * | 7/2005 | Ganesan | 370/241 |
| 2005/0261006 | A1 * | 11/2005 | Hirsbrunner et al. | 455/457 |
| 2006/0116127 | A1 * | 6/2006 | Wilhoite et al. | 455/442 |
| 2006/0121916 | A1 * | 6/2006 | Aborn et al. | 455/456.5 |
| 2006/0291419 | A1 * | 12/2006 | McConnell et al. | 370/331 |
| 2007/0087748 | A1 * | 4/2007 | Du et al. | 455/436 |
| 2007/0195754 | A1 * | 8/2007 | Shaheen | 370/352 |
| 2007/0202869 | A1 * | 8/2007 | Cheng et al. | 455/426.1 |
| 2007/0213078 | A1 * | 9/2007 | Shaheen | 455/466 |
| 2008/0137565 | A1 * | 6/2008 | Chen et al. | 370/310 |
| 2009/0170519 | A1 * | 7/2009 | Wilhoite et al. | 455/436 |
| 2009/0258670 | A1 * | 10/2009 | Juang | 455/552.1 |
| 2011/0177805 | A1 * | 7/2011 | Maki et al. | 455/422.1 |
| 2011/0255416 | A1 * | 10/2011 | Ganesan | 370/241 |
| 2012/0008612 | A1 * | 1/2012 | Maki | 370/338 |
| 2012/0069765 | A1 * | 3/2012 | Soto | 370/252 |

* cited by examiner

*Primary Examiner* — Jay P Patel
(74) *Attorney, Agent, or Firm* — Altis Law Group, Inc.

(57) ABSTRACT

A mobile phone includes a mobile communication module and a wireless communication module. The mobile communication module registers with a session initiation protocol (SIP) server by a first Internet protocol (IP) address and a voice over Internet protocol (VoIP) account over a mobile communication network, and enters a suspension mode when the mobile communication module has no communication. The wireless communication module registers with the SIP server by use of a second IP address and the VoIP account over a wireless communication network, and enters a suspension mode when the wireless communication module has no communication. The wireless communication module receives an SIP invite from the SIP server over the wireless communication network and wakes up the mobile communication module when a remote phone calls the mobile phone. The mobile communication module transmits an SIP response to the SIP server over the mobile communication network after being waked up.

10 Claims, 3 Drawing Sheets

MOBILE PHONE AND METHOD FOR RECEIVING CALLS

BACKGROUND

1. Technical Field

The present disclosure relates to mobile communications, and more particularly to a mobile phone and a method for receiving calls.

2. Description of Related Art

A mobile phone can often connect to a third generation mobile communication network (called 3G network for short) including a plurality of base stations and a WIFI network including a plurality of access points. In the WIFI network, the access points assign different Internet protocol (IP) addresses for the mobile phone, so the mobile phone needs to change the IP addresses when the mobile phone roams from one access point to another access point. Thus, quality of communication of the mobile phone is affected.

In the 3G network, an operator of the 3G network assigns one IP address for the mobile phone, so the mobile phone does not need to change the IP address when the mobile phone roams from one base station to another base station. Thus, quality of communication of the mobile phone is assured.

Therefore, the mobile phone prefers to establish a voice over Internet protocol (VoIP) session with a remote phone over the 3G network instead of the WIFI network in order to assure quality of communication.

However, the 3G network is connectionless, so the mobile phone needs to turn on an always-on program, and periodically send connection data to the 3G network to keep a connection with the 3G network if the mobile phone wants to receive calls from a remote phone over the 3G network. Thus, the mobile phone consumes much power.

BRIEF DESCRIPTION OF THE DRAWINGS

The details of the disclosure, both as to its structure and operation, can best be understood by referring to the accompanying drawing, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
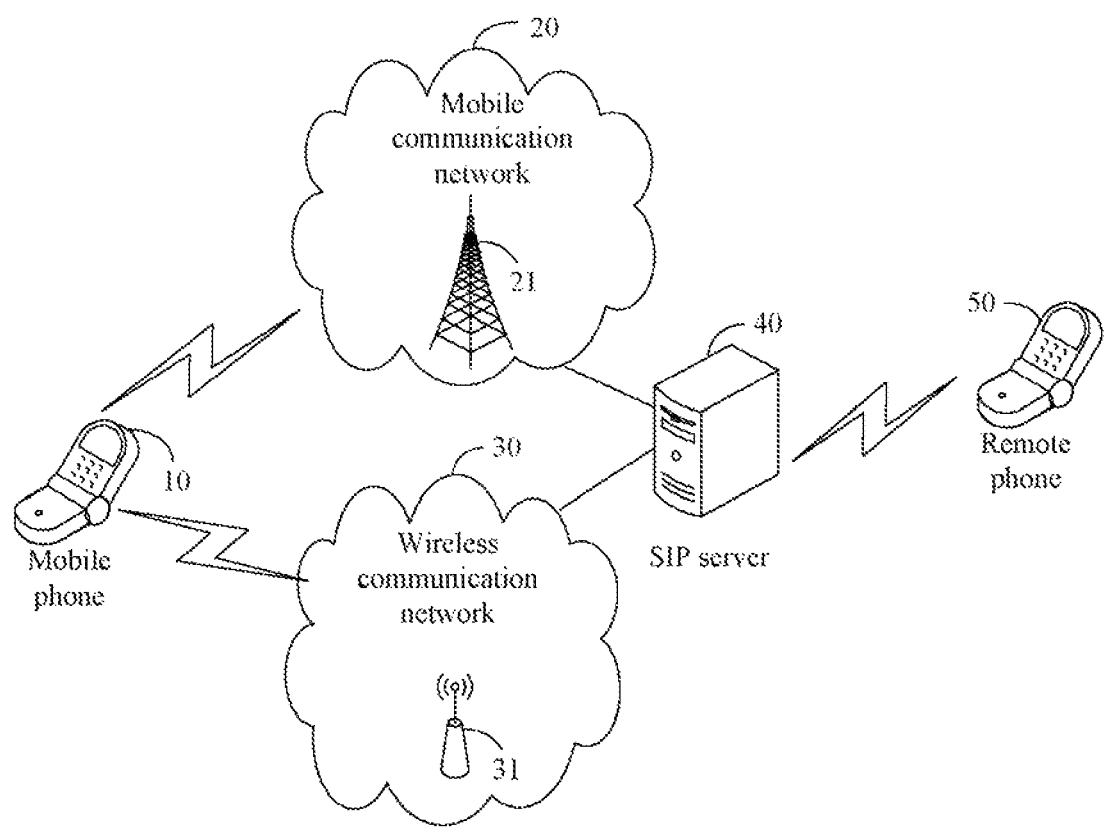
FIG. 1 is a schematic diagram of an application environment of one embodiment of a mobile phone in accordance with the present disclosure.

FIG. 1 is a schematic diagram of an application environment of one embodiment of a mobile phone 10 in accordance with the present disclosure. In one embodiment, the mobile phone (local phone) 10 has a first Internet protocol (IP) address and a second IP address. The first IP address is assigned by an operator of a mobile communication network 20, so the mobile phone 10 does not need to change the IP address when the mobile phone 10 roams from one base station 21 to another base station 21 in the mobile communication network 20. The second IP address is assigned by one access point 31 of a wireless communication network 30, so the mobile phone 10 needs to change the IP address when the mobile phone 10 roams from one access point 31 to another access point 31 in the wireless communication network 30.

Figure 2:
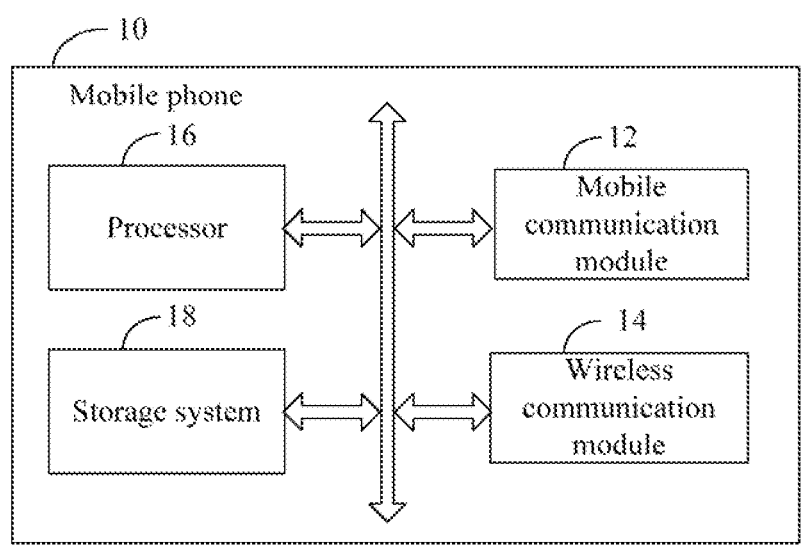
FIG. 2 is a schematic diagram of functional modules of one embodiment of the mobile phone in accordance with the present disclosure.

In FIG. 2, the mobile phone 10 includes a mobile communication module 12, a wireless communication module 14, at least one processor 16, and a storage system 18. The modules 12-14 may comprise computerized code in the form of one or more programs that are stored in the storage system 18. The computerized code includes instructions that are executed by the at least one processor 16 to provide functions for the modules 12-14. The storage system 18 may be a hard disk drive, flash memory, or other computerized memory device.

In one non-limiting example, the mobile communication network 20 may be a third generation mobile communication network (3G network), and the mobile communication module 12 may be a third generation mobile communication module (3G module). The wireless communication network 30 may be a WIFI network, and the wireless communication module 14 may be a WIFI module.

The mobile communication module 12 is operable to connect to the mobile communication network 20 according to the first IP address. In one embodiment, the mobile communication network 20 (such as the 3G network) is connectionless, so the mobile communication module 12 needs to turn on an always-on program, and periodically send connection data to the mobile communication network 20 to keep a connection with the mobile communication network 20. If the mobile communication module 12 enters a suspension mode (a low power mode), the mobile communication module 12 does not need to execute the always-on program, and does not send connection data to the mobile communication network 20 to disconnect from the mobile communication network 20. Accordingly, the mobile communication module 12 cannot receive any data from the mobile communication network 20.

The wireless communication module 14 is operable to connect to the wireless communication network 30 according to the second IP address. In one embodiment, even if the wireless communication module 14 enters the suspension mode, the wireless communication module 14 can receive desirable data from the wireless communication network 30 because the wireless communication module 14 (such as the WIFI module) has a function of WIFI wake-on-LAN.

In one embodiment, the mobile communication module 12 registers with an session initiation protocol (SIP) server 40 by use of the first IP address (such as 10.135.1.100) and a voice over Internet protocol (VoIP) account (such as 1234567) over the mobile communication network 20, and then enters the suspension mode when the mobile communication module 12 has successfully registered with the SIP server 40 and has no communication (that is when the mobile communication module 12 is not in communication with another phone, for example). In one non-limiting example, the mobile communication module 12 turns off the always-on program, and does not send connection data to the mobile communication network 20 to disconnect from the mobile communication network 20, so as to enter the suspension mode.

Simultaneously, the wireless communication module 14 registers with the SIP server 40 by use of the second IP address (such as 192.168.1.100) and the VoIP account, and enters the suspension mode when the wireless communication module 14 has successfully registered with the SIP server 40 and has no communication.

Afterwards, when a remote phone 50 calls the VoIP account of the mobile phone 10 to the SIP server 40, the SIP server 40 transmits an SIP invite to the mobile communication module 12 and the wireless communication module 14 respectively over the mobile communication network 20 and the wireless communication network 30 according to the VoIP account, the first IP address, and the second IP address.

The wireless communication module 14 in the suspension mode can receive the SIP invite from the SIP server 40 over the wireless communication network 30 because the wireless communication module 14 has the function of WIFI wake-on-LAN. That is, the wireless communication module 14 can receive the call from the remote phone 50 over the wireless communication network 30.

However, the mobile communication module 12 in the suspension mode cannot receive the SIP invite from the SIP server 40 over the mobile communication network 20 because the mobile communication module 12 in the suspension mode turns off the always-on program and disconnects from the mobile communication network 20. That is, the mobile communication module 12 cannot receive the call from the remote phone 50 over the mobile communication network 20.

The wireless communication module 14 wakes up the mobile communication module 12 according to the SIP invite after the wireless communication module 14 receives the SIP invite from the SIP server 40 over the wireless communication network 30.

After being waked up, the mobile communication module 12 turns on the always-on program, and periodically sends connection data to the mobile communication network 20 to keep the connection with the mobile communication network 20. Then the mobile communication module 12 transmits an SIP response (such as 200 OK) to the SIP server 40 over the mobile communication network 20, so as to inform the SIP server 40 that the mobile communication module 12 has received the call from the remote phone 50 over the mobile communication network 20.

The SIP server 40 only receives the SIP response from the mobile phone 10 over the mobile communication network 20, and does not receive the SIP response from the mobile phone 10 over the wireless communication network 30. Thus, the SIP server 40 considers that the mobile phone 10 only receives the call from the remote phone 50 over the mobile communication network 20, and accordingly establishes a VoIP session between the mobile phone 10 and the remote phone 50 over the mobile communication network 20.

Figure 3:
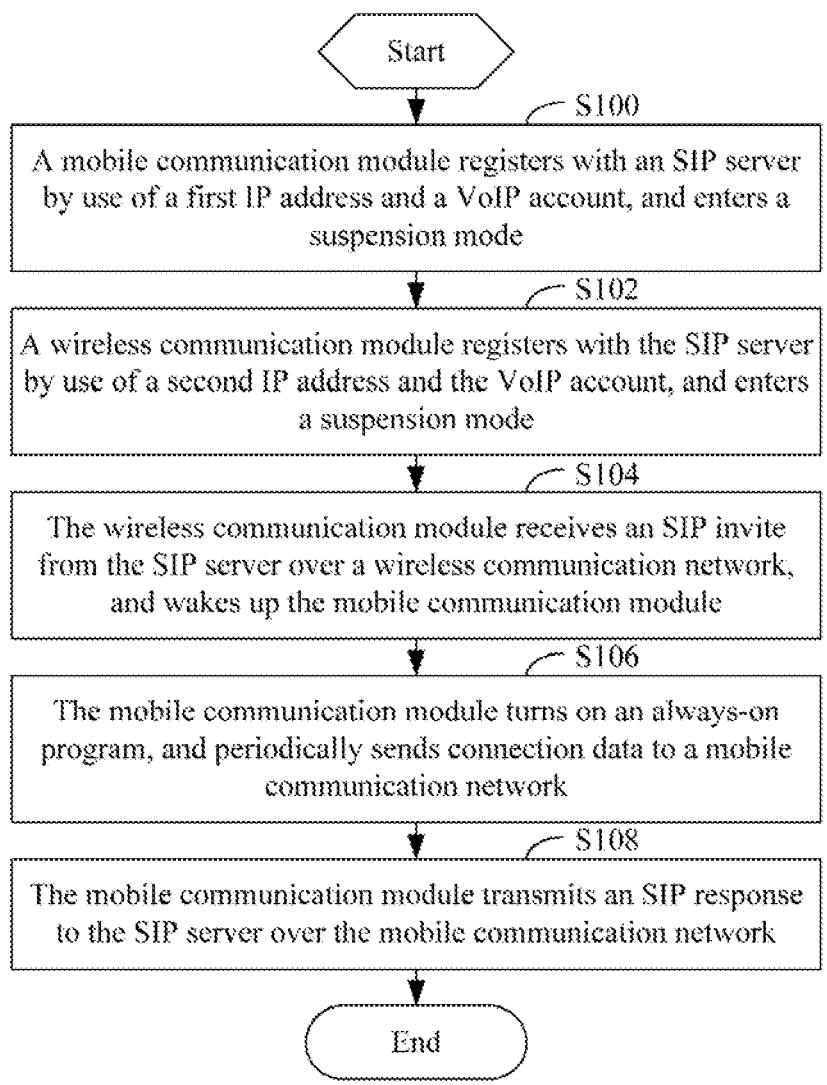
FIG. 3 is a flowchart of one embodiment of a method for receiving calls in accordance with the present disclosure.

FIG. 3 is a flowchart of one embodiment of a method for receiving calls in accordance with the present disclosure. The method may be embodied in the mobile phone 10, and is executed by the functional modules such as those of FIG. 2.

Depending on the embodiment, additional blocks may be added, others deleted, and the ordering of the blocks may be changed while remaining well within the scope of the disclosure.

In block S100, the mobile communication module 12 registers with the SIP server 40 by use of the first IP address (such as 10.135.1.100) and a VoIP account (such as 1234567) over the mobile communication network 20, and then enters a suspension mode when the mobile communication module 12 has successfully registered with the SIP server 40 and has no communication. In one non-limiting example, the mobile communication module 12 turns off the always-on program, and does not send connection data to the mobile communication network 20 to disconnect from the mobile communication network 20, so as to enter the suspension mode.

In block S102, the wireless communication module 14 registers with the SIP server 40 by use of the second IP address and the VoIP account, and enters a suspension mode when the wireless communication module 14 has successfully registered with the SIP server 40 and has no communication.

Afterwards, when the remote phone 50 calls the VoIP account of the mobile phone 10 to the SIP server 40, the SIP server 40 transmits an SIP invite to both the mobile communication module 12 and the wireless communication module 14 respectively over the mobile communication network 20 and the wireless communication network 30 according to the VoIP account, the first IP address, and the second IP address.

In block S104, the wireless communication module 14 receives the SIP invite from the SIP server 40 over the wireless communication network 30, and wakes up the mobile communication module 12 according to the SIP invite.

In block S106, the mobile communication module 12 turns on the always-on program, and periodically sends connection data to the mobile communication network 20 to keep the connection with the mobile communication network 20.

In block S108, the mobile communication module 12 transmits an SIP response (such as 200 OK) to the SIP server 40 over the mobile communication network 20, so as to inform the SIP server 40 that the mobile communication module 12 has received the call from the remote phone 50 over the mobile communication network 20.

The SIP server 40 only receives the SIP response from the mobile phone 10 over the mobile communication network 20, and does not receive the SIP response from the mobile phone 10 over the wireless communication network 30. Thus, the SIP server 40 considers that the mobile phone 10 only receives the call from the remote phone 50 over the mobile communication network 20, and accordingly establishes a VoIP session between the mobile phone 10 and the remote phone 50 over the mobile communication network 20.

In conclusion, the mobile phone 10 of the present disclosure turns off the always-of program to disconnect from the mobile communication network 20 when the mobile phone 10 has no communication. When the wireless communication module 14 receives a call from the remote phone 50 via the function of WIFI wake-on-LAN, the wireless communication module 14 wakes up the mobile communication module 12. Then, the mobile communication module 12 turns on the always-on program to keep the connection with the mobile communication network 20, and receives the call from the remote phone 50 over the mobile communication network 20. Thus, the mobile phone 10 consumes less power.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A mobile phone, comprising:
   at least one processor;
   a storage system;
   one or more programs that are stored in the storage system and are executed by the at least one processor, the one or more programs comprising:
   a mobile communication module operable to register with a session initiation protocol (SIP) server by use of a first Internet protocol (IP) address and a voice over Internet protocol (VoIP) account over a mobile communication network, and enter a suspension mode when the mobile communication module has successfully registered with the SIP server and has no communication; and a wireless communication module operable to register with the SIP server by use of a second IP address and the VoIP account over a wireless communication network, and enter a suspension mode when the wireless communication module has successfully registered with the SIP server and has no communication;

wherein when a remote phone calls the VoIP account to the SIP server, the SIP server transmits an SIP invite to both the mobile communication module and the wireless communication module over the mobile communication network and the wireless communication network, respectively, according to the VoIP account, the first IP address, and the second IP address;

wherein the wireless communication module receives the SIP invite over the wireless communication network, and wakes up the mobile communication module according to the SIP invite;

wherein when waked up, the mobile communication module transmits an SIP response to the SIP server over the mobile communication network, so as to inform the SIP server that the mobile communication module has received the call from the remote phone over the mobile communication network.

2. The mobile phone of claim 1, wherein the first IP address is assigned by the mobile communication network, the mobile communication network is a third generation mobile communication network, and the mobile communication module is a third generation mobile communication module.

3. The mobile phone of claim 2, wherein the second IP address is assigned by the wireless communication network, the wireless communication network is a WIFI network, and the wireless communication module is a WIFI module.

4. The mobile phone of claim 1, wherein the mobile communication module turns off an always-on program and does not send connection data to the mobile communication network to disconnect from the mobile communication network, so as to enter the suspension mode.

5. The mobile phone of claim 4, wherein the mobile communication module further turns on the always-on program and periodically sends the connection data to the mobile communication network to keep the connection with the mobile communication network after the mobile communication module is waked up.

6. A method for receiving calls of a mobile phone comprising a mobile communication module and a wireless communication module, the method comprising:

the mobile communication module registering with a session initiation protocol (SIP) server by use of a first Internet protocol (IP) address and a voice over Internet protocol (VoIP) account over a mobile communication network, and entering a suspension mode when the mobile communication module has successfully registered with the SIP server and has no communication;

the wireless communication module registering with the SIP server by use of a second IP address and the VoIP account over a wireless communication network, and entering a suspension mode when the wireless communication module has successfully registered with the SIP server and has no communication, wherein when a remote phone calls the VoIP account to the SIP server, the SIP server transmits an SIP invite to the mobile communication module and the wireless communication module over the mobile communication network and the wireless communication network, respectively, according to the VoIP account, the first IP address, and the second IP address;

the wireless communication module receiving the SIP invite over the wireless communication network, and waking up the mobile communication module according to the SIP invite; and the mobile communication transmitting an SIP response to the SIP server over the mobile communication network after waked up, in order to inform the SIP server that the mobile communication module has received the call from the remote phone over the mobile communication network.

7. The method of claim 6, wherein the first IP address is assigned by the mobile communication network, the mobile communication network is a third generation mobile communication network, and the mobile communication module is a third generation mobile communication module.

8. The method of claim 7, wherein the second IP address is assigned by the wireless communication network, the wireless communication network is a WIFI network, and the wireless communication module is a WIFI module.

9. The method of claim 6, wherein the step of the mobile communication module entering a suspension mode comprises: the mobile communication module turning off an always-on program and not sending connection data to the communication network to disconnect from the mobile communication network.

10. The method of claim 9, further comprising: the mobile communication module turning on the always-on program and periodically sending the connection data to the mobile communication network to keep the connection with the mobile communication network after the mobile communication module is waked up.

\* \* \* \* \*